US009071438B2

(12) United States Patent
Lagimonier et al.

(10) Patent No.: US 9,071,438 B2
(45) Date of Patent: *Jun. 30, 2015

(54) SYSTEM FOR EFFICIENTLY HANDLING CRYPTOGRAPHIC MESSAGES CONTAINING NONCE VALUES IN A WIRELESS CONNECTIONLESS ENVIRONMENT

(71) Applicant: TeleCommunication Systems, Inc., Annapolis, MD (US)

(72) Inventors: Todd Lagimonier, Delray Beach, FL (US); Jim Voris, Cockeysville, MD (US)

(73) Assignee: TeleCommunication Systems, Inc., Annapolis, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 13/902,074

(22) Filed: May 24, 2013

(65) Prior Publication Data

US 2013/0339737 A1 Dec. 19, 2013

Related U.S. Application Data

(63) Continuation of application No. 13/447,902, filed on Apr. 16, 2012, now Pat. No. 8,453,240, which is a continuation of application No. 12/926,840, filed on Dec. 13, 2010, now Pat. No. 8,161,553, which is a continuation of application No. 09/932,982, filed on Aug. 21, 2001, now Pat. No. 7,856,660.

(51) Int. Cl.
*H04L 29/06* (2006.01)
*H04L 9/32* (2006.01)
(Continued)

(52) U.S. Cl.
CPC ............... *H04L 9/321* (2013.01); *H04L 63/04* (2013.01); *H04L 63/14* (2013.01); *H04L 63/1408* (2013.01); *H04W 12/02* (2013.01); *H04W 12/12* (2013.01)

(58) Field of Classification Search
CPC ......... H04L 9/321; H04L 63/04; H04L 63/14; H04L 63/1408; H04W 12/02; H04W 12/12

USPC .............................................. 726/22; 713/170
See application file for complete search history.

(56) References Cited

U.S. PATENT DOCUMENTS 5,163,046 A 11/1992 Hahne
5,715,403 A 2/1998 Stefik
(Continued)

OTHER PUBLICATIONS

Gouda et al., Anti-Replay Window Protocols for Secure IP, Department of Computer Sciences, University of Texas, 310-315.
(Continued)

*Primary Examiner* — Michael Pyzocha
(74) *Attorney, Agent, or Firm* — William H. Bollman

(57) ABSTRACT

A secure communication module that accepts a cryptographic message if a nonce value for the received message is greater than the largest nonce value yet seen. If the received nonce value is not the largest nonce value yet seen, the secure communication module compares the received nonce value with a nonce acceptance window. If the nonce value falls outside the nonce acceptance window, the secure communication module rejects the received message and assumes a replay attack. Alternatively, if the nonce value falls within the nonce acceptance window, the secure communication module compares the received nonce value with a replay window mask. If comparison with the replay window mask indicates that the received nonce value has been seen before, the secure communication module rejects the received message and assumes a replay attack. Otherwise, the secure communication module accepts the message and adds the received nonce value to the replay window mask.

12 Claims, 5 Drawing Sheets

(51) Int. Cl.
*H04W 12/12* (2009.01)
*H04W 12/02* (2009.01)

(56) References Cited

U.S. PATENT DOCUMENTS

| | | |
|---|---|---|
| 5,724,424 A | 3/1998 | Gifford |
| 5,751,719 A | 5/1998 | Chen et al. |
| 5,931,947 A | 8/1999 | Burns |
| 5,970,143 A | 10/1999 | Schneier |
| 6,141,759 A | 10/2000 | Braddy |
| 6,256,623 B1 | 7/2001 | Jones |
| 6,311,274 B1 | 10/2001 | Day |
| 6,339,801 B1 | 1/2002 | Hefferon |
| 6,389,016 B1 | 5/2002 | Sabaa |
| 6,418,143 B1 | 7/2002 | Rezaiifar |
| 6,438,617 B1 | 8/2002 | Savitzky |
| 6,505,253 B1 | 1/2003 | Chiu |
| 6,574,675 B1 | 6/2003 | Swenson |
| 6,604,144 B1 | 8/2003 | Anders |
| 6,625,274 B1 | 9/2003 | Hoffpauir |
| 6,633,907 B1 | 10/2003 | Spencer |
| 6,751,797 B1 | 6/2004 | Desgranger |
| 6,757,255 B1 | 6/2004 | Aoki |
| 6,757,720 B1 | 6/2004 | Weschler, Jr. |
| 6,760,746 B1 | 7/2004 | Schneider |
| 6,772,216 B1 | 8/2004 | Ankireddipally |
| 6,792,605 B1 | 9/2004 | Roberts |
| 6,813,637 B2 | 11/2004 | Cable |
| 6,826,606 B2 | 11/2004 | Freoman |
| 6,882,637 B1 | 4/2005 | Le |
| 6,912,588 B1 | 6/2005 | Jardin |
| 6,978,384 B1 | 12/2005 | Milliken |
| 7,020,698 B2 | 3/2006 | Andrews |
| 7,072,973 B1 | 7/2006 | Newson |
| 7,123,617 B1 | 10/2006 | Abrol |
| 7,203,834 B1 | 4/2007 | Benayoun |
| 2001/0017844 A1 | 8/2001 | Mangin |
| 2002/0019844 A1 | 2/2002 | Kurowski |
| 2002/0038360 A1 | 3/2002 | Andrews |
| 2002/0156841 A1 | 10/2002 | Landfeldt |

OTHER PUBLICATIONS

Hughes, Combined DES-CBC, HMAC and Replay Prevention Security Transform, IPsec Working Group, Jun. 1996.

SYSTEM FOR EFFICIENTLY HANDLING CRYPTOGRAPHIC MESSAGES CONTAINING NONCE VALUES IN A WIRELESS CONNECTIONLESS ENVIRONMENT

The present application is a continuation of U.S. Appl. Ser. No. No. 13/447,902, entitled "System for Efficiently Handling Cryptographic Messages Containing Nonce Values in a Wireless Connectionless Environment Without Comprising Security", filed Apr. 16, 2012, to Lagimonier et al., now U.S. Pat. No. 8,453,240; which in turn is a continuation of U.S. Appl. Ser. No. 12/926,840, entitled "System for Efficiently Handling Cryptographic Messages Containing None Values in a Wireless Connectionless Environment Without Comprising Security ", filed Dec. 13, 2010, to Lagimonier et al., now U.S. Pat. No. 8,161,553; which in turn is a continuation of U.S. Appl. Ser. No. 09/932,982, entitled "System for Efficiently Handling Cryptographic Messages Containing None Values in a Wireless Connectionless Environment Without Comprising Security", filed Aug. 21, 2001, to Lagimonier et al., now U. S. Pat. No. 7,856,660, the entirety of all of which are expressly incorporated herein by reference.

TECHNICAL FIELD

The invention generally relates to message processing in a distributed computer network. More particularly, the invention relates to preventing replay attacks while providing flexibility for receiving out of order messages.

DESCRIPTION OF THE RELATED ART

Recently, there has been a rapid proliferation of private and public data networks. For example, the Internet, as a public network, has grown to be an international phenomenon. The popularity of the internet has drawn more users who view it as a source of information and/or as a marketplace. The typical user may access the Internet through a network interface card (e.g., a modem) of a desktop personal computer via a local Internet service provider.

As more users rely on the Internet and other private networks for information exchange and services, the reach of the data networks for information exchange and services, the reach of the data networks has extended to wireless domain. Mobile users may now use Wireless Application Protocol (WAP) enabled telephones, text pagers, personal digital assistants, laptop computers, and other similar portable electronic devices to access a similar set of services as the services provided to the desktop computer.

Since some of the data networks exchange information over publicly accessible areas, there is an opportunity for mischief Anyone who has access to a computer in a data network can intercept signals carrying proprietary information traveling along the data network. In order to transact any type of business over an open data network, companies or individuals must have an efficient, reliable and secure manner to conduct private communications therebetween. Thus, security becomes a primary concern over the open data networks, e.g., Internet, and there have been many efforts in progress aimed at protecting proprietary information traveling over open data networks.

One way to remedy the security issues of data networks is the use of cryptographic techniques to secure a private communication between two parties. The cryptographic techniques provide a way to transmit information across an untrusted communication channel without disclosing the contents of the information to anyone accessing the communication channel.

One known method of secure communication is a symmetric key cryptography, which involves the use of a single, share secret key. Here, a source of information encodes ("encrypts") information and the recipient of the information decodes ("decrypts") it using the shared encryption key. An encryption key is a code or number which, when taken together with an encryption algorithm, defines a unique transformation used to encrypt or decrypt information.

Although cryptography may provide secure communication between users, it may still be vulnerable to other types of security attacks. In some portions of data networks, users are prone to a security attack known as a replay attack. The replay attack involves malicious users intercepting and recording transactions, i.e., message traffic, between unsuspecting users. The recorded message traffic is then rebroadcasted, and thus, disrupts the system by replaying a previous message traffic.

One technique to rectify this type of security attack is to use incrementing nonce values. Message traffic between two parties may contain a nonce value that is always increasing for each message sent. Accordingly, nonce values are always increasing, and old messages may be detected because they contain a lower than expected nonce value. Thus, the old messages may be rejected or be considered as part of a replay attack.

The above technique generally suffices in connection-oriented data networks because the order of the messages transferred between the source and recipient may be guaranteed. Many parts of open data networks rely on a connectionless protocol e.g., Internet Protocol. A source of information may be configured to send datagrams or (packets/messages) Over a network to the recipient by utilizing a connectionless protocol. The source is not concerned with the ordering of messages sent because it is the responsibility of the recipient to reorder and assemble the received messages. As such, applying the above-mentioned cryptographic technique to a connectionless protocol environment, a recipient may reject valid messages as well as invalid messages.

One solution to out-of-order messages in a connectionless protocol network is the use of a non-repeating, randomly generated number for each nonce value. Instead of increasing in value for each message sent, each nonce value is randomly generated using an algorithm guaranteed to never issue repeating random numbers. However, there are drawbacks to this solution. In particular, this solution requires that senders and recipients keep track of each previously used nonce value in a used nonce list and to check a new nonce value against the used nonce list. The used nonce list may grow to be very large, which may run counter to the performance capabilities of many wireless devices. By way of example, the computing power of a typical cellular phone is less than one percent of that of a regular desktop computer, the memory capacity thereof is generally less than 250 kilobytes. Accordingly, it may be impractical to store the used nonce list in a wireless device and checking a received nonce against the used nonce list may be unacceptable from a performance point of view.

Another solution for the out-of-order message may be the use of a timestamp. Senders and receivers synchronize their respective clocks and use a timestamp for each nonce. Recipients may then allow messages with timestamps that fall within a small time window. However, there may be disadvantages with this solution. In particular, timestamps are difficult to use in a wireless environment. Time-of-day capabilities of wireless devices are typically under the control of the wireless device users. In fact, many wireless devices do not maintain a time-zone concept. Moreover, the use of timestamps has an inherent security flaw. This approach allows all messages that fall within a given time window. Although the time window is generally short, duplicate messages falling within the given time window will not be detected, and thus, not prevent a replay attack.

SUMMARY OF THE INVENTION

In accordance with the principles of the present invention, a method of processing messages is disclosed. The method includes comparing a nonce value of a received message with a largest nonce value yet seen and comparing the nonce value to an acceptance window in response to the nonce value not exceeding the largest nonce value yet seen. The method further includes rejecting the received message in response to the nonce value falling outside the acceptance window.

One aspect of the present invention provides for an apparatus for processing messages. The apparatus includes a communication interface configured to transmit and receive a plurality of messages and a controller. The controller is configured to compare a nonce value of a received message with the largest nonce value yet seen and the controller is also configured to compare the nonce value to an acceptance window in response to the nonce value not exceeding the largest nonce value yet seen. The controller is further configured to reject the received message in response to the nonce value falling outside the acceptance window.

Another aspect of the present invention provides for a computer readable storage medium on which is embedded one or more computer programs. The one or more computer programs implement a method of processing messages. The method includes comparing a nonce value of a received message with a largest nonce value yet seen and comparing the nonce value to an acceptance window in response to the nonce value not exceeding the largest nonce value yet seen. The method also includes rejecting the received message in response to the nonce value falling outside the acceptance window.

Yet another aspect of the present invention provides for a system for processing messages in a peer-to-peer configuration. The system comprises a first peer configured to provide secure communication, a second peer configured to provide secure communication, and a secure communication module, where the secure communication module is configured to be executed by the first peer and second peer. The secure communication module is configured to compare the nonce value to a filter in response to a nonce value of a received packet not exceeding a largest nonce value yet seen and the secure communication module is also configured to compare the nonce value to a replay mask. The secure communication module is further configured to accept the received packet in response to the comparison of the nonce value and the replay mask being false.

Yet another aspect of the present invention provides for an interceptor device for processing messages. The interceptor device includes a network interface, an expected sequence register configured to enumerate an expected sequence number of a message received from the second network device, a memory configured to store a replay mask, and a controller. The controller is configured to compare a sequence number of a received packet via the network interface to a filter in response to the sequence number not exceeding a largest sequence number yet seen retrieved from the expected sequence register and to compare the sequence number to the replay mask retrieved from the memory. The controller is also configured to accept the received packet in response to the comparison of the sequence number and the replay mask being false.

Additional advantages and novel features of the invention will be set forth in part in the description which follows and in part will become apparent to those skilled in the art upon examination of the following or may be learned by practice of the invention.

DESCRIPTION OF DRAWINGS

Features and advantages of the present invention will become apparent to those skilled in the art from the following description with reference to the drawings, in which.

DETAILED DESCRIPTION OF PREFERRED EMBODIMENTS

Figure 1:
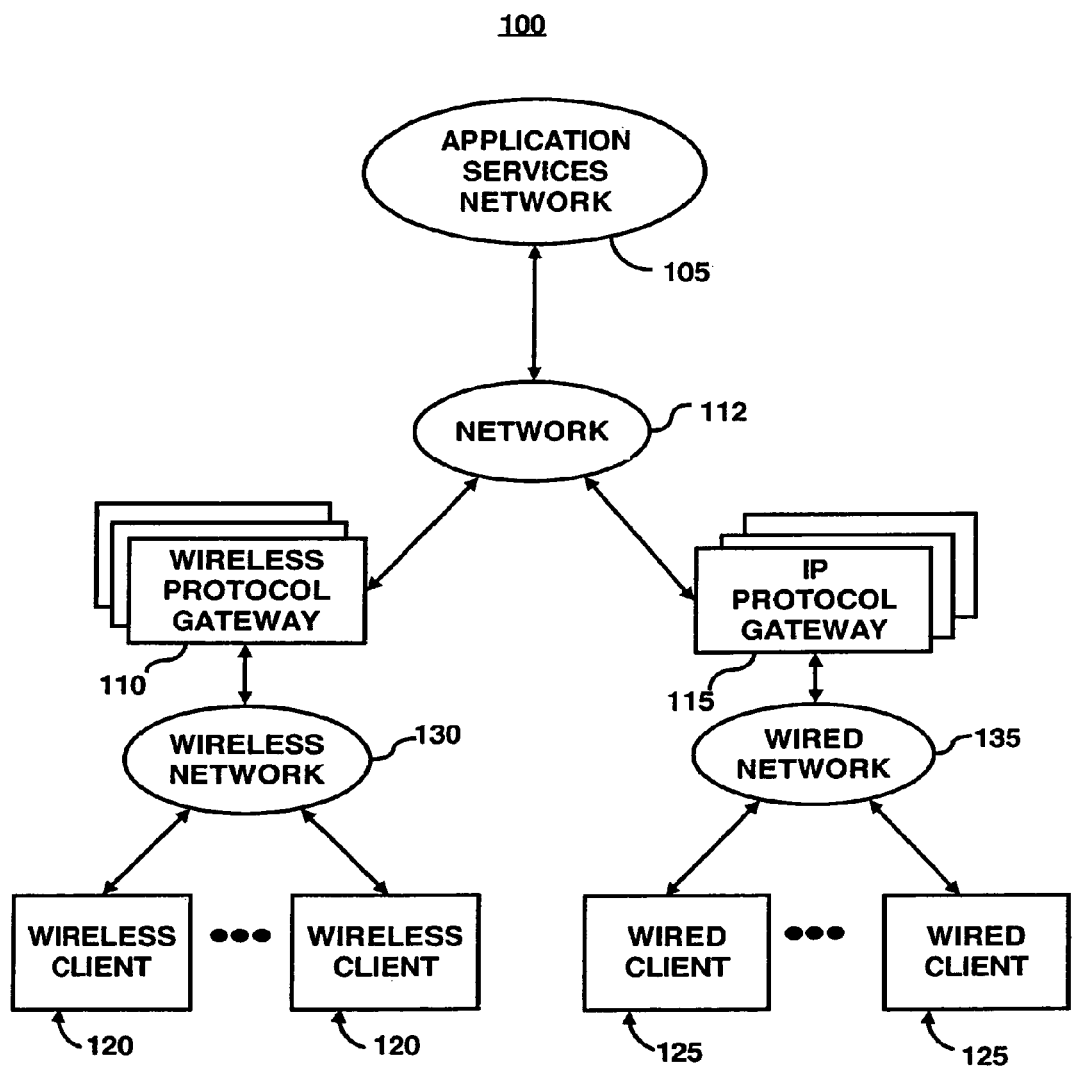
FIG. 1 illustrates a computer network in which an exemplary embodiment of a secure communication module may be implemented.

For simplicity and illustrative purposes, the principles of the present invention are described by referring mainly to an exemplary embodiment thereof. Although the preferred embodiment of the invention may be practiced in a peer-to-peer communication environment one of ordinary skill in the art will readily recognize that the same principles are equally applicable to, and can be implemented in, any environment requiring secure communications, and that any such variation would be within such modifications that do not depart from the true spirit and scope of the present invention. Moreover, in the following detailed description, references are made to the accompanying drawings, which illustrate specific embodiments in which the present invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

In accordance with the principles of the present invention, a secure communication module is utilized to provide secure communication between a sender and a recipient, i.e., between two peers of a network. The secure communication module, which is executed by both a sender and a recipient, may be configured to examine a received cryptographic message (or datagram/packet) with a nonce value. A nonce value (or sequence number) may be a numeric value that may be used to detect duplicate cryptographic messages. The secure communication module may be configured to compare the received nonce value with a largest nonce value yet seen. The secure communication module may be further configured to accept the cryptographic message in response to the received nonce value being greater than the largest nonce value yet seen. The secure communication module may be further configured to accept the cryptographic message in response to the received nonce value being greater than the largest nonce value yet seen. The secure communication module may be further configured to track the nonce values seen by the secure communication module by utilizing a replay window mask. The secure communication module may be further configured to replace the largest nonce value yet seen with the received nonce value and to adjust a nonce acceptance window (or filter) according to the replaced largest nonce value yet seen. The nonce acceptance window may be configured to provide a moving range based on the largest nonce value yet seen for accepting messages that have arrived out of order. A user and/or network administrator may statically set the range. Alternatively, the range may be set dramatically.

If the received nonce value is not the largest nonce value yet seen, the secure communication module may be configured to compare the received nonce value with the nonce acceptance window. If the received nonce value falls outside the nonce acceptance window, the secure communication module may be further configured to reject the received message and assume that a replay attack has been detected.

The secure communication module may be further configured to determine if the received nonce value has been previously received by comparing the replay window mask to the received nonce value in response to the received nonce value falling within the nonce acceptance window. If the comparison is true, i.e., the secure communication module has seen the message previously, the secure communication module may be further configured to reject the received message and assume a replay attack. Otherwise, the secure communication module may be further configured to accept the message and mark the communication module, users may be provided with secure communications in a connectionless protocol network by preventing replay attacks while providing for out-of-order communications.

FIG. 1 illustrates a communication network 100 where an exemplary embodiment may be practiced in accordance with the principles of the present invention. In particular, the communication network 100 includes an application services network 105, one of more protocol gateways which may be wireless-based 110 or wire-based (e.g., an Internet Protocol ("IP") protocol gateway 115), and wireless/wired clients, 120 and 125, respectively.

The wireless and wired protocol gateways, 110 and 115, may be configured to interface with the application services network 105 via a network 112. The network 112 may be configured to provide a communication channel between the application services network 105 and the protocol gateways, 110 and 115. A local area network, a token ring network, a wide area network, the Internet or some combination thereof may implement the network 112.

The wireless protocol gateway 110 may be further configured to interface with the wireless clients 120 via a wireless network 130. The wireless network 130 may be configured to provide wireless communication protocol support for the wireless clients 120. The wireless network 130 may be configured to support wireless network protocols such as Cellular Digital Packet Data, Mobitex, IEEE 802.11b, Wireless Application Protocol, GSM-Global System for Mobile Communications, and other similar protocols.

A text-pager, a personal digital assistant, a wireless mobile telephone with integrated displays and other similar devices may implement the wireless clients 120. Each of the wireless clients 120, as well as the wired clients 125 may be configured to execute a client program, which may be implemented as a software program, utility, and/or subroutine to interface with the application services network 105. The client may be configured to provide the software (e.g., utilities, application specific software, etc.,) to support the respective services designated for each type of wireless/wired client devices, 120 and 125 respectively.

The client software of the wireless/wired client devices, 120 and 125 may be further configured to provide a secure communications module (not show). Users of the wireless/wired client devices, 120 and 125, may exchange messages without fear of a replay attack while permitting the messages to arrive out-of-order within an acceptance window by utilizing the secure communication module. The secure communication module may be a software program, utility, object class or subroutine executed by and/or in conjunction with the client software. Alternatively, the secure communication module may be an electronic device attached to a network interface of the client devices, 120 and 125.

Similarly, the wired protocol gateways 115 may be configured to interface with the wired clients 120 via a wired network 135. The wired network 135 may be configured to provide wired communication protocol support for the wired client devices 125. The wired network 135 may be configured to support wired protocols such as Transmission Control Protocol/Internet Protocol, X.25, IEEE 802.5, IEEE 802.3, Asynchronous Transfer Mode, and other similar network protocols.

The wired client devices 125 may be implemented as a laptop computer with a telephone modem, a desktop computer with a telephone modem, server/client, and other similar computing platforms. Each of the wired client devices 125 may be configured to execute a client implemented by a software program, utility and/or subroutine to interface with the wired network 135 and, subsequently, the application services network 105.

Accordingly, messages from wireless client devices 120 and/or wired client devices 125 are transmitted to their protocol gateways, 110 and 115, respectively, over their respective networks, 130 and 135, respectively. The protocol gateways, 110 and 115, may be configured to encapsulate the transmitted messages to the network protocol of the application services network 105. Similarly, as messages are transmitted from the application services network 105 to the client devices, 120 and 125, the protocol gateways, 110 and 115, reformat the transmitted messages into the respective network protocol of the clients, 120 and 125.

The application services network 105 may be configured to provide a variety of services to the wireless and wired clients, 120 and 125, respectively. These services may include session-base services such as instant messaging, database querying, and other similar services, i.e., services that permit client devices, 120 and 125 to exchange information and/or services as peers.

Figure 2:
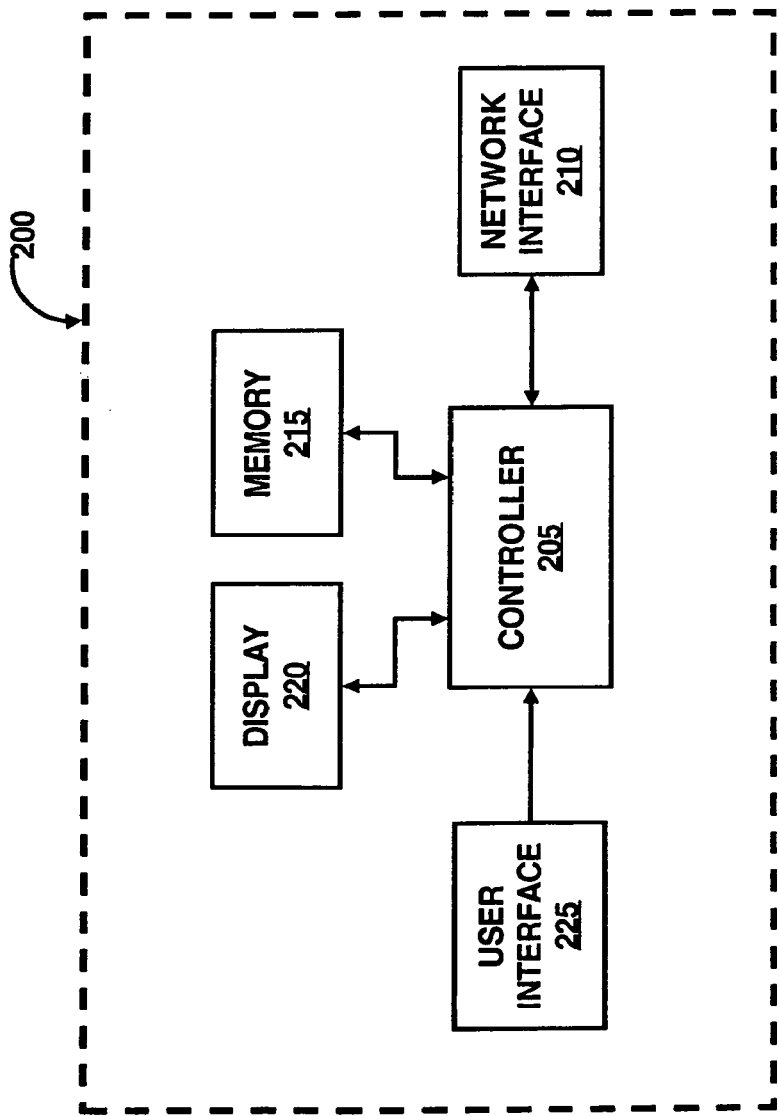
FIG. 2 illustrates an exemplary block diagram of a client device shown in FIG. 1 in accordance with the principles of the present invention.

FIG. 2 illustrates an exemplary embodiment of a client device, 120 or 125, shown in FIG. 1 in accordance with the principles of the present invention. The client device 200 may include wireless devices (e.g., a text-messaging pager, a wireless telephone, a personal digital assistant, etc.) or wired devices (e.g., a laptop computer, a computer, a server with clients, etc.). As shown in FIG. 2, the client device 200 may include a controller 205, a network interface 210, a memory 215, a display 220 and a user interface 225.

Although, for purely illustrative purposes, FIG. 2 illustrates the client device 200 with the above-mentioned components, it should be readily apparent to those of ordinary skill in the art that FIG. 2 represents a generalized schematic illustration of a client device and that other components may be added or existing components may be subtracted without departing from the spirit or scope of the present invention.

The controller 205 may be configured to provide a computing platform for the software/firmware that provides the functionality of the client device 200 and to execute a computer program embodiment of the secure communication module (not shown). The controller 205 may be implemented with a microprocessor, a micro-controller, an application specific integrated circuit ("ASJC") a digital signal processor, or other similar integrated circuits.

The controller 205 may be interfaced with a network interface 210. The network interface 210 may be configured to provide the capability for the user to receive and transmit information via radio frequency techniques such as cellular networks, pager networks, etc. The network interface 210 may be implemented by a pager interface, a wireless modem, a personal communication services ("PCS") interface, and the like. Alternatively, the network interface 210 may be configured to provide the capability for the user to receive and transmit information via wired communication protocols such as IEEE 802.3, Integrated Services Digital Network, token ring, and other similar protocols.

The controller 205 may be further configured to interface with the memory 215. The memory 215 may be configured to provide the capability to store information, executable copies of the client software as well as a computer program embodiment of the secure communication module, and to provide application memory space. The memory 215 may be implemented with random access memory ("RAM"), flash memory, or other re-writable memory or in combination with a read-only memory to provide permanent storage.

The display 220 may be configured to interface with the controller 205. The display 220 may be further configured to provide an interface for information to be displayed, graphical user interfaces to enable navigation through the functionality of the client device 200. The display 220 may be implemented with a liquid crystal display, thin film display, cathode ray tube, or other similar display technologies.

The controller 205 may be configured to interface with the user interface 225, which is configured to provide a man-machine interface between the user and the client device 200. The user interface 225 may be implemented by a numeric keypad, an alphanumeric keypad, keyboard, or the like.

Figure 3:
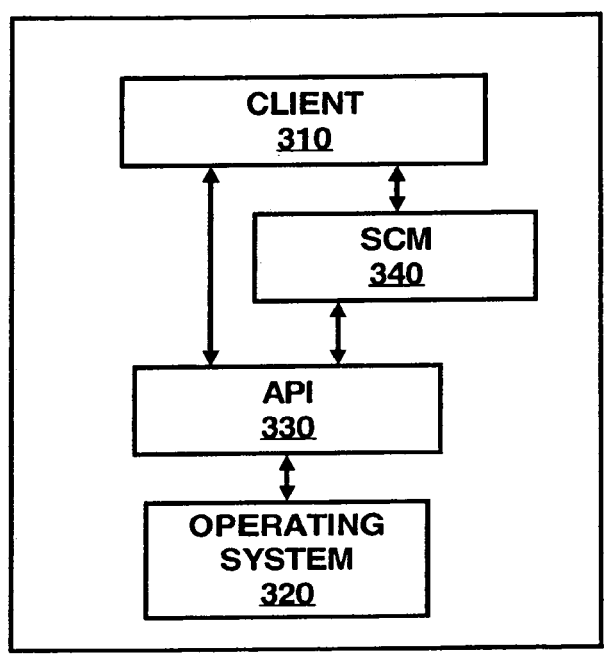
FIG. 3 illustrates an exemplary block diagram of a software architecture in a client device shown in FIGS. 1 and 2.

FIG. 3 illustrates an exemplary block diagram of a software architecture 300 of a client device 2000 shown in FIG. 2. As shown in FIG. 3, the software architecture 300 may include a client 310, an operating system 320, an application program interface 330, and a secure communication module 340. Although, for purely illustrative purposes, FIG. 3 illustrates the client device with above-mentioned software architecture, it should be readily apparent to those of ordinary skill in the art that FIG. 3 represents a generalized illustration of the software architecture and that other software components may be added or existing software components may be subtracted without departing from the spirit or scope of the present invention.

The client 310 may be configured to provide the software (e.g., utilities, application specific software, etc. to support the session services designated for each type of wireless/wired client devices, 120 and 125, respectively.

The operating system 320 of the client device 200 may be configured to manage software programs or applications that provide functionality to the client device 200 such as EPOC, POCKET PC, WINDOWS CE, RIM OS and other similar operating systems. The operating system 320 may be further configured to provide an interface to the software applications and to the underlying hardware components, as shown in FIG. 2, of the client device 200 through an application program interface (API) 330.

The secure communication module 340 may be configured to intercept received messages from a sender and to determine whether the received messages are valid. The secure communication module 340 may be a separate software program executed by the client 310. Alternatively, the secure communication module 340 may be executed as a utility program as part of the API 330 or may be incorporated as a subroutine in a network interface program of the client device 200. Any software (or hardware) implementation of the secure communication module 340 executed by the client is within the scope and spirit of the present invention.

Figure 4:
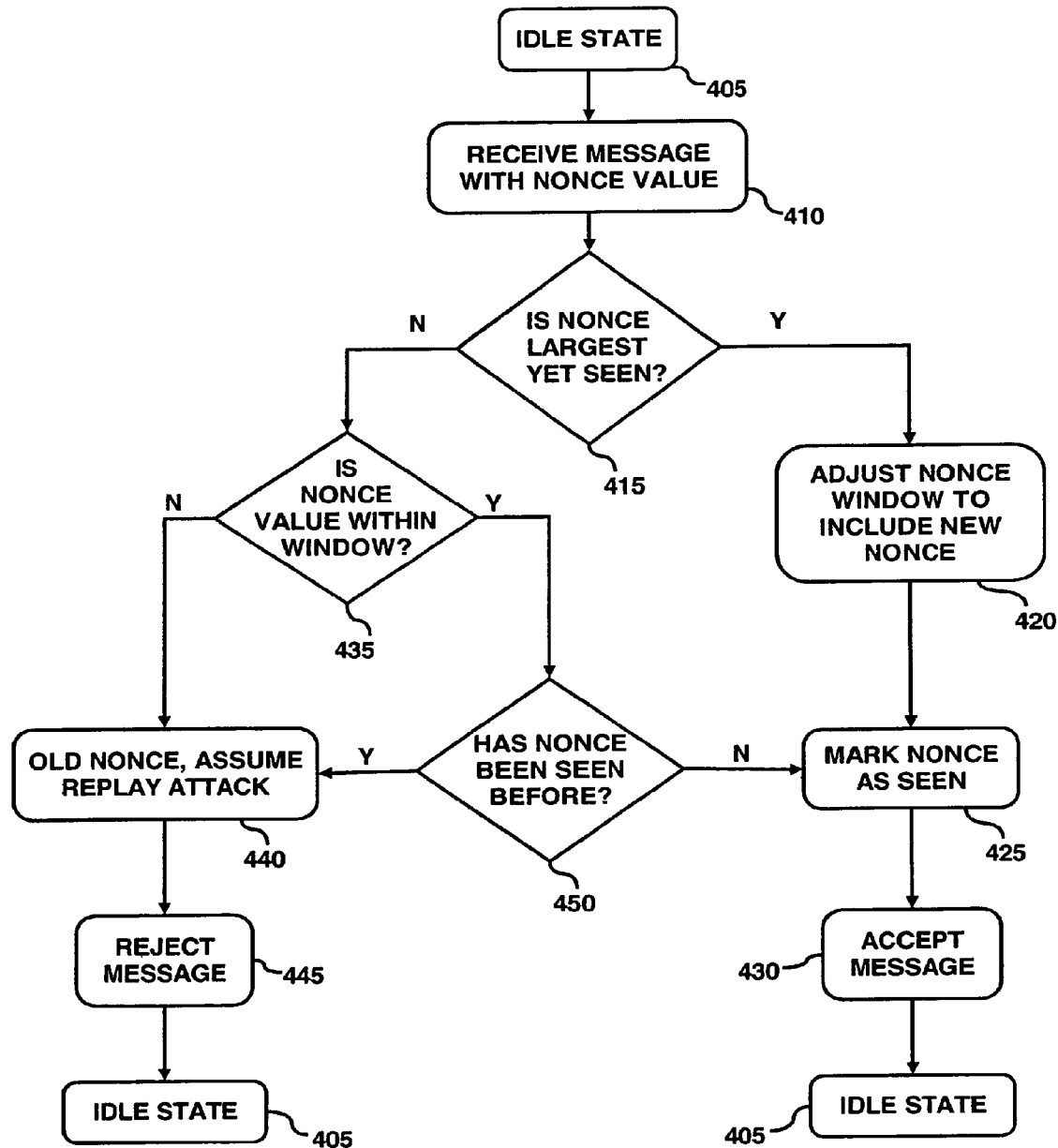
FIG. 4 illustrates an exemplary flow diagram of the secure communication module according to the principles of the present invention.

FIG. 4 illustrates an exemplary flow diagram 400 of a secure communication module 340 shown in FIG. 3 in accordance with the principles of the present invention. The following description of the flow diagram 400 is made with reference to the block diagram illustrated in FIG. 2, and thus makes reference to the elements illustrated therein.

It is to be understood that the steps illustrated in the flow diagram 400 may be implemented as a program, a utility, an object class, and/or subroutine in any desired computer accessible medium. Such medium may include the memory 215, internal and external computer memory units, and other types of computer accessible media, such as a floppy disk, a ZIP-DISK, and/or compact disc readable by a storage device. Thus, although particular reference is made in the following description of FIG. 2 to the controller 205 performing certain functions, it is to be understood that any desired electronic device capable of executing computer software may perform those functions. Furthermore, the functions may be coded in FORTRAN, C, C++, JAVA or other computer languages without departing from the scope or spirit of the present invention.

As shown in FIG. 4, the controller 20 executing a computer program embodiment of the secure communication module 340 may be configured to be in an idle state 405. In step 410, the client device 200 receives a message (or packet/datagram) with a nonce value via the network interface 210. The client device 200 may perform additional processing that decrypts the received message into a decrypted message with a nonce value in a header portion of the received message.

In step 415, the controller 205 may be configured to compare the nonce value of the received decrypted message with a largest nonce value seen, which is the largest nonce value seen by the controller 205. The controller 205 may be further configured to allocate location(s) in the memory 215 to create a register for the storage of the largest nonce value seen. Alternatively, the register may be implemented using a combination of flip-flops, a register circuit, and/or a type of memory circuit.

Moreover, the nonce values may be incrementing until a very large maximum value, which may be defined by a user and/or network administrator. At the point of the maximum value, the secure communication module 340 may be configured to reset the largest nonce value yet seen along with generating a new cryptographic key. The reason for the large maximum value is to prevent replay attacks from occurring across multiple sessions between two parties. For instance, if for every new session, the nonce value is reset, a previous session with large nonce values may play havoc on a new session. The new session would not have seen the large nonce values of the previous session, thus accepting the messages of the previous session. Accordingly, by using incrementing nonce values with a large maximum value, replay attacks using previous sessions may be detected in a new session.

Returning to FIG. 4, if the received nonce value is the largest yet seen by the controller 205 for the current session, the controller 205 may be configured to adjust a nonce acceptance window (or filter) based on the received nonce value, in step 420. The nonce acceptance window may be configured to set a range of nonce values that may be accepted by the secure communication module. The range may be defined by a user and/or network administrator. Alternatively, the range of the nonce acceptance window may be set dynamically based on time-of-arrival of messages, network traffic, heuristically based on how many "out-of-order" messages are expected within in a given time frame, or other similar parameters. The controller 205 may be further configured to replace the current largest nonce value yet seen with the received nonce value.

In step 425, the controller 205 may be configured to designate or mark the received nonce value as a nonce value seen by marking a respective bit in a replay window (or value) mask, stored in memory 215, for tracking the nonce values seen within The nonce acceptance window. The replay window mask may be configured to determine whether the controller 205 of the secure communication module has previously received the received nonce value.

In particular, the replay window mask may be configured to have a bit representing a nonce value within the nonce acceptance window. For each nonce value seen by the controller 205 within the nonce acceptance window, the respective bit position in the replay window mask is set to indicate the nonce value as seen inclusive with the largest nonce value yet seen. For example, for the case where the largest nonce value seen is one hundred (100) and a nonce acceptance window is fifteen (15), the replay window mask would be 15 bits, with one bit assigned to the nonce values of 86-100. If a message is received with a nonce value equal to 86, the bit representing 86 in the replay window is set. Furthermore, for each new largest nonce value yet seen, the replay window mask is shifted a number of times equivalent to the difference between the new and old largest nonce value yet seen.

In step 430, the controller 205 may be configured to accept the received message and the controller 205 returns to the idle state of step 405 to wait for the next message.

Returning to step 415, if the received nonce value is not the largest seen, the controller 205 may be configured to determine whether the received nonce value is within the nonce acceptance window, in step 435. If the received nonce value is not within the nonce acceptance window, i.e., falls outside the nonce acceptance window, the controller 205 may be configured to designate the received nonce value as an old nonce value and assume that the network device 200 is under replay attack, in step 440. Subsequently, the controller 205, in step 445, may be configured to reject the received message and return to idle state of step 405.

Otherwise, if the received nonce value is within the nonce acceptance window, the controller 205 may be configured to determine whether the received nonce value has been seen before by determining if the bit position representing the received nonce value had been previously set, in step 450.

If the bit position representing the received nonce value is set, the controller 205 may be configured to go to step 440 as described herein above. Otherwise, if the bit position for received nonce value is not set, the controller 205 may be further configured to go to step 425 as described herein above.

Figure 5:
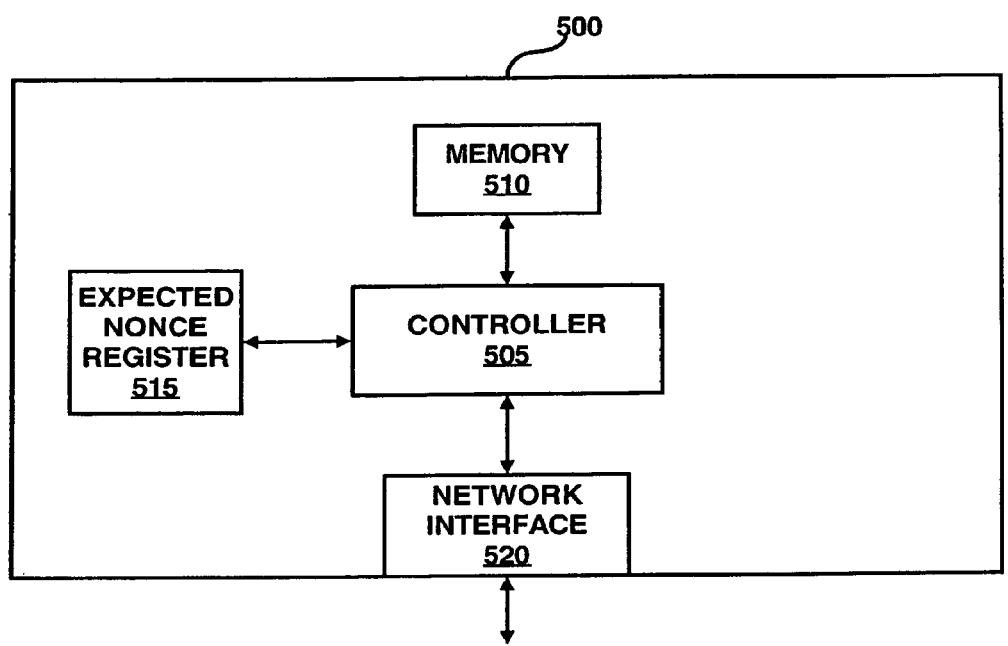
FIG. 5 illustrates another embodiment of the secure communication module in accordance with the principles of the present invention.

FIG. 5 illustrates an exemplary block diagram 500 of another embodiment of the secure communication module in accordance with the principles of the present invention. As shown in FIG. 5, the secure communication module includes a controller 505, a memory 510, an expected nonce register 515, and a network interface 520. The controller 505 of the secure communication module may be configured to provide secure communication between a sender and a recipient. In particular, the secure communication module may be an electronic device implemented by a combination of discrete integrated circuits or an ASIC.

The embodiment of the secure communication module may be implemented as a supplemental electronic device that is interfaced with the network interface 210 of a client device 200. This embodiment, i.e., an interceptor device, may be configured to intercept the received messages and to determine if each received message is a valid message.

The controller 505 may be configured to provide an execution platform for the software that provides the functionality of the secure communication module. An exemplary embodiment of the software would be computer code (e.g., C, C++, PASCAL, JAVA, or other computer languages) version of the flow diagram illustrated in FIG. 3 and described herein above. A microprocessor, a micro-controller, an application specific integrated circuit, a digital signal processor or other similar electronic processing device may implement the controller 505.

The memory 510 may be configured to provide storage for software and data as well as a software application environment for the controller 505. The memory 510 may be a combination of permanent (e.g., a PROM, EEPROM, disc storage, flash memory), temporary (e.g., random access memory) memories, or any other type of electronic device that may provide storage of data and software.

The expected nonce register 515 may be configured to provide storage of the largest nonce value seen by the secure communication module for a session. The expected nonce register 515 may be implemented by a series of flip-flops, a register circuit, a memory circuit, or other similar electronic devices.

The network interface 520 of the secure communication module 500 may be configured to provide a communication channel between a client device and a network. The network interface 520 may be further configured to intercept incoming messages or packets and to determine the validity of the received message as described below. If the message is accepted, the network interface 520 may be further configured to pass the accepted message of the client device.

The controller 505 of secure communication module 500 may be configured to compare the received nonce value of a received message through the interface 520 with a largest nonce value yet seen retrieved from the expected nonce register 515. If the received nonce is greater than the value retrieved from the expected nonce register 515, the controller 505 may be configured to accept the received message and pass it to the client device.

The controller 505 of the secure communication module may be further configured to designate the received nonce value as seen by settling a respective bit in a replay window mask, which is configured to track the nonce values seen by the controller 505, stored in a memory location(s) in memory 510.

The controller 505 may be further configured to replace the largest nonce value yet seen in the largest nonce register with the received nonce value. The controller 505 may be further configured to adjust the nonce acceptance window according to the replaced largest nonce value yet seen. A user and/or network administrator may statically set the range of the nonce acceptance window. Alternatively, the range may be set dynamically.

Otherwise, when the received nonce value is not the largest nonce value yet seen, the controller 505 of the secure communication module may be configured to compare the received nonce value with the nonce acceptance window. If the received nonce value fails to fall within the acceptance window, the controller 505 may be further configured to reject the received message and assume that a replay attack has been detected.

If the received nonce value falls within the acceptance window, the controller 505 may be further configured to determine if the controller 505 has previously seen the received nonce value. The controller 505 may be further configured to compare the received nonce value with the replay window mask. If the comparison is true, the controller 505 may be further configured to reject the received message and add the received nonce value to the nonce value seen list. Accordingly, users may be provided with the capability of preventing (and/or detecting) replay attacks while providing for out-of-order messages by utilizing the secure communication module.

Certain embodiments of the present invention may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method of processing out-of-order data packets, comprising:
   obtaining a largest nonce value from among a plurality of nonce values of previous data packets;
   adjusting, at a receiving device, a size of a range of acceptable nonce values within an acceptance window based around said largest nonce value;
   accepting, at said receiving device, a newly received out-of-order data packet including a newly received nonce value when said newly received nonce value is within said acceptance window; and
   resetting said largest nonce value to said newly received nonce value when said accepted, newly received nonce value exceeds said largest nonce value.

2. The method of processing out-of-order data packets according to claim 1, further comprising:
   adjusting said size of said range of acceptable nonce values within said acceptance window based on said reset largest nonce value.

3. The method of processing out-of-order message packets according to claim 1, wherein:
   said largest nonce value is associated with a first session.

4. The method of processing out-of-order message packets according to claim 1, wherein:
   said largest nonce value is associated with a second session.

5. The method of processing out-of-order message packets according to claim 1, further comprising:
   generating a new cryptographic key.

6. A method of processing out-of-order data packets, comprising:
   obtaining a largest nonce value from among a plurality of nonce values of previous data packets;
   adjusting, at a receiving device, a size of a range of acceptable nonce values within an acceptance window based around said largest nonce value;
   accepting, at said receiving device, a newly received out-of-order data packet including a newly received nonce value when said newly received nonce value is within said acceptance window; and
   adjusting said size of said range of acceptable nonce values within said acceptance window when said accepted, newly received nonce value exceeds said largest nonce value.

7. The method of processing out-of-order data packets according to claim 6, further comprising:
   resetting said largest nonce value to said newly received nonce value when said accepted, newly received nonce value exceeds said largest nonce value.

8. The method of processing out-of-order message packets according to claim 6, wherein:
   said largest nonce value is associated with a first session.

9. The method of processing out-of-order message packets according to claim 6, wherein:
   said largest nonce value is associated with a second session.

10. The method of processing out-of-order message packets according to claim 6, further comprising:
    generating a new cryptographic key.

11. A method of rejecting a replay attack in out-of-order data packets, comprising:
    obtaining a largest nonce value from among a plurality of nonce values of previous data packets;
    adjusting, at a receiving device, a size of a range of acceptable nonce values within an acceptance window based around said largest nonce value; and
    rejecting, at said receiving device, a newly received out-of-order data packet including a newly received nonce value when said newly received nonce value is outside of said acceptance window.

12. The method of rejecting a replay attack in out-of-order data packets according to claim 11, further comprising:
    designating said newly received out-of-order data packet as a replay attack.

* * * * *